United States Patent
Kraus et al.

(10) Patent No.: US 9,196,032 B1
(45) Date of Patent: Nov. 24, 2015

(54) EQUIPMENT AND METHOD FOR THREE-DIMENSIONAL RADIANCE AND GAS SPECIES FIELD ESTIMATION

(71) Applicant: Honeywell International Inc., Morristown, NJ (US)

(72) Inventors: Kurt Kraus, Tulsa, OK (US); Kwong Wing Au, Bloomington, MN (US); Matthew Martin, Tulsa, OK (US); Sharath Venkatesha, Minnetonka, MN (US); Stefano Bietto, Tulsa, OK (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 3 days.

(21) Appl. No.: 14/296,265

(22) Filed: Jun. 4, 2014

(51) Int. Cl.
*G06K 9/00* (2006.01)
*G06T 7/00* (2006.01)
*G06T 15/08* (2011.01)

(52) U.S. Cl.
CPC .............. *G06T 7/0004* (2013.01); *G06T 7/002* (2013.01); *G06T 7/0024* (2013.01); *G06T 15/08* (2013.01); *G06T 2207/10012* (2013.01); *G06T 2207/10048* (2013.01)

(58) Field of Classification Search
CPC .............. C10J 2300/1606; G01J 11/00; G01J 2005/0077; G01J 5/0088
USPC ......................................................... 382/141
See application file for complete search history.

(56) References Cited

U.S. PATENT DOCUMENTS

| | | | |
|---|---|---|---|
| 5,109,277 A | 4/1992 | James | |
| 8,018,590 B2 | 9/2011 | Davis, Jr. et al. | |
| 8,138,927 B2 | 3/2012 | Diepenbroek et al. | |
| 2011/0085030 A1 | 4/2011 | Poe et al. | |
| 2012/0002035 A1* | 1/2012 | Li et al. | 348/82 |
| 2012/0085028 A1* | 4/2012 | Leininger | 48/86 R |
| 2012/0174590 A1 | 7/2012 | Krull et al. | |

FOREIGN PATENT DOCUMENTS

| | | |
|---|---|---|
| CN | 1069960 C | 8/2001 |
| CN | 1308224 A | 8/2001 |
| CN | 1352369 A | 6/2002 |
| DE | 102005036146 A1 | 2/2007 |

(Continued)

OTHER PUBLICATIONS

Ishino et al., "Three Dimensional Computerized Tomographic Reconstruction of instantaneous Distribution . . . " JSME International Journal, Series B (2005), 48(1), 34-40.

(Continued)

*Primary Examiner* — Mike Rahmjoo (57) ABSTRACT

A process is provided for estimating a three-dimensional (3D) radiance field of a combustion process in an enclosure. An on-line intensity-temperature calibration is performed based on an association between an intensity of an image pixel and an actual temperature associated with a selected region in the enclosure. The intensity of the corresponding image is transformed to a radiance image based on settings of an image-capturing device and the on-line calibration. A registration and alignment estimation of the image is performed based on positional information of the enclosure. The radiance image is aligned based on the registration estimation. The 3D radiance field having voxels of the enclosure is estimated based on a two-dimensional to 3D transforming of the aligned radiance images.

20 Claims, 4 Drawing Sheets

(56) References Cited

FOREIGN PATENT DOCUMENTS

| WO | WO 86/07455 A1 | 12/1986 |
| WO | WO 2011/067003 A1 | 6/2011 |

OTHER PUBLICATIONS

Lu et al., "Advance Monitoring and Characterisation of Combustion Flames," 20th Annual Meeting of the Combustion and Advance Power Generation Divisions, Apr. 22, 2009, 1-25.

Hossain et al., "Three-dimensional reconstruction of flame temperature and emissivity distribution . . . ," Measurement Science and Technology (2013), 24(7).

Yong, Yan, "Advanced Sensors and Monitoring Techniques for the optimization of Coal and Biomass Fired Power Plants," University of Zagreb Lecture, May 2012, 1-23.

"FLIR GF309—Infrared camera for furnace and electrical inspections," Product Brochure and Spec., FLIR Systems, Inc. <http://www.flir.com>, 1999, Obtained Apr. 9, 2014.

* cited by examiner

EQUIPMENT AND METHOD FOR THREE-DIMENSIONAL RADIANCE AND GAS SPECIES FIELD ESTIMATION

The present invention relates generally to a process for estimating conditions of a combustion process, and more particularly to a process for accurate estimation of a three-dimensional thermal radiance field and gas species field of a furnace enclosure.

BACKGROUND OF THE INVENTION

Accurately analyzing internal conditions of a furnace is an essential task for an operator to better control temperatures of different regions in a furnace enclosure for producing products more efficiently and saving energy-related costs. Typically, image-capturing devices, such as color cameras, infrared spectrometers, filtered cameras, and the like, are installed in the furnace enclosure for detecting the temperatures of the furnace enclosure. Intensities of image pixels received from the devices have a direct relationship with the temperatures of viewed surfaces inside the furnace. Similarly, multi-spectral cameras have been used to detect the temperature of a flame and gas species.

A certain method of video-based technology provides color or intensity images to the operator allowing the operator to manually interpret the state of the combustion process based on the images. Another technology performs off-line intensity-temperature calibration and maps each color image to a specific temperature image, thereby providing a two-dimensional (2D) projection of the temperature and/or radiance field. Other technologies, such as laser, and acoustic, offer three-dimensional (3D) temperature and/or radiance field estimation at specific locations inside the furnace enclosure. However, a number of required sensors, a related cost, and a complicated installation often make such systems impractical in a large scale enclosure.

Another technology for video-based, three-dimensional temperature and/or radiance field estimation applies thermal radiation transfer equations to the temperature images. However, this method is inefficient and inaccurate, and does not provide a required resolution and accuracy due to complex, iterative computations required to resolve unknown temperature and radiance fields in the enclosure. Another reason for the inaccuracy is attributed to poor-quality images caused by incorrect or limited controls of the image-capturing devices. Achieving an acceptable accuracy in high resolution and accurate alignment of the images along with information about a physical structure of the enclosure is essential. As discussed above, relative positions of the image-capturing devices and imaging areas, such as enclosure walls, often shift their alignments and thus cause significant errors.

A certain method uses multi-spectral imaging technology for the detection of the gas composition in an open environment. This method only detects the presence or absence of certain gases along a viewing path, but cannot provide the distribution of gas species in a three dimension field.

Therefore, there is a need for an improved method of estimating and detecting temperature and radiance fields of the enclosure without generating substantial errors or variations during the combustion process of the furnace. Further, the estimation of gas species field provides the operator a better tool to improve the efficiency of the furnace enclosure.

BRIEF SUMMARY OF THE INVENTION

The present invention is directed to a process for estimating and detecting three-dimensional temperature, radiance and gas species fields of a furnace enclosure based on a set of multi-spectral images captured by a plurality of multi-spectral image-capturing devices.

An important feature of certain embodiments is that the present process solves the problem of real-time visualization, simulation and understanding of the combustion process in large scale enclosure. The present process measures and indicates chemical species and concentrations within an enclosure. Such species information is used to selectively control the combustion process by modulation or manipulation of input fuel sources, combustion air sources, or mechanical features of an associated burner or furnace based on indications from three-dimensional optical spectral observations.

For example, a fuel/air ratio of a combustion system may be adjusted. Exact locations or regions within an enclosure can be determined, which contain the largest amounts of specific pollutants or other combustion process intermediate reactants. A burner operation or design may be modulated or modified to optimize a specific desired response based on the determination. The desired responses may include basic flame detection, reduction or minimization of pollutants, optimization of the fuel/air ratio for maximum fuel efficiency or other process needs, such as optimization of radiant heat flux profile from a burner flame, or maximization of specific reaction processes using a closed-loop fuel/air ratio control of sub-stoichiometric combustion.

In practice, the present process may be applied to any combustion enclosure, whose flames are generated by, for example, premix, diffusion mix, solid fuel, liquid fuel, and gaseous fuel used in industrial, residential, commercial, or power burners, flares, or thermal oxidizers. It is also contemplated that the present process may be used to validate and/or optimize indications resulting from computational models of physical systems. Specifically, in certain embodiments, the present process observes a physical enclosure, and corresponding computational model input parameters are adjusted to conform to the physical observations.

Another important feature of certain embodiments is that the present process utilizes an array of optical spectral detectors, such as the multi-spectral image-capturing devices or cameras, disposed in array alignment surrounding the enclosure. By surrounding the furnace in the array alignment, tomographic reconstruction, triangulation, or other processing techniques can be used to establish three-dimensional concentrations and spatial physical locations of various combustion intermediate or final products. The intermediate or final products include chemical radicals and molecules, such as OH, NO, $NO_X$, CO, $CO_2$, N, $N_2$, $O_2$, O, H, $H_2$, $H_2O$, C, S, SO, $SO_2$, and $SO_3$.

An advantage of the detectors arranged in the array alignment is that high resolution of the resulting image and data may be derived based on the images obtained from the detectors. Since multiple detectors are arranged in a spaced pattern array configuration, failures of one or more detectors due to breakage, fouling, blocked field of view or other similar defects, only affect a part of the array, and the remaining, functional detectors continue to provide images and associated data. Each detector detects an intensity of various light emissions from atomic or molecular species residing in the enclosure across a predetermined span of a light spectrum. Each atomic particle is known to emit at a specific frequency. Since the particle's light emission frequency is unique and identifiable from those of other resident or potentially resident particles, an individual constituent can be automatically identified by a computer processer. Based on the intensity of the frequency of detected radiance, an associated degree of concentration or relative location can be inferred using the computer processer.

By computationally employing tomographic reconstruction, triangulation, or other suitable processing techniques to combine the data from an array of detectors, three-dimensional geometric and spatial properties of various species or atomic particles/molecules can be determined. Another advantage of certain embodiments of the present process is that the determination of the location and concentration of various chemical constituents within the enclosure is performed in real-time and on-line to modulate input streams or mechanical aspects of the burners/flame for optimization of desired properties of the radiance and gas species fields in the enclosure. The foregoing and other aspects and features of the present invention will become apparent to those of reasonable skill in the art from the following detailed description, as considered in conjunction with the accompanying drawings.

DETAILED DESCRIPTION OF THE INVENTION

Figure 1:
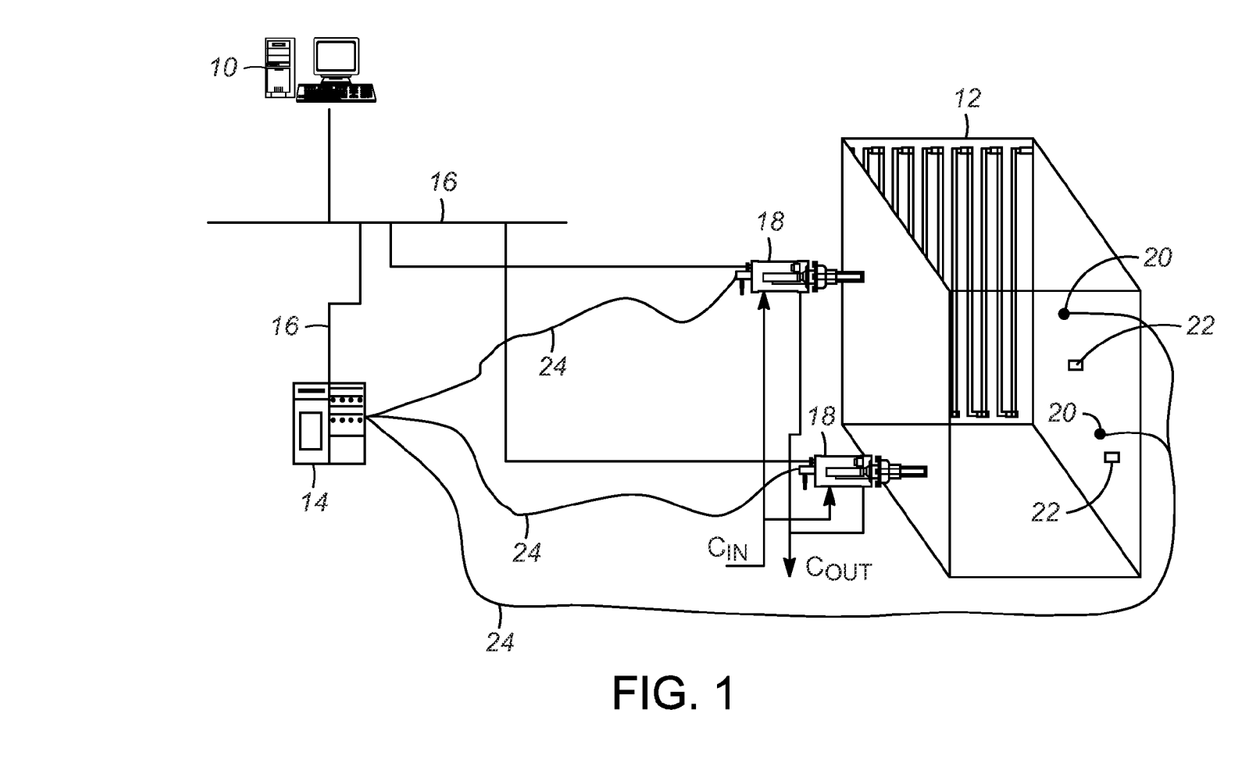
FIG. 1 illustrates an exemplary use of the present process in a camera system configuration.

Referring now to FIG. 1, an exemplary estimation unit 10 using an embodiment of the present process is provided for accurately estimating a three-dimensional temperature and thermal radiance field of a combustion process inside a large scale enclosure 12, such as an industrial furnace. As used herein, the term "unit" may refer to, be part of, or include an Application Specific Integrated Circuit (ASIC), an electronic circuit, a computer processor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present process should not be so limited since other modifications will become apparent to the skilled practitioner.

The estimation unit 10 is coupled to a server or computing device 14 (including a, e.g., database and video server), and is programmed to perform tasks and display relevant data for different functional units via a network 16. It is contemplated that other suitable networks can be used, such as a corporate Intranet, a local area network (LAN) or a wide area network (WAN), and the like, using dial-in connections, cable modems, high-speed ISDN lines, and other types of communication methods known in the art. All relevant information can be stored in the databases for retrieval by the estimation unit 10 or the computing device 14 (e.g., as a data storage device and/or a machine readable data storage medium carrying computer programs).

A plurality of image-capturing devices 18 are mounted around the enclosure 12 (with two devices 18 being shown in this example, but with additional devices being included, if desired). The image-capturing devices have the ability to capture the response in one or multiple parts of the electromagnetic spectrum including visible, ultra-violet, near infrared (NIR), mid wave infrared (MWIR) and long wave infrared (LWIR). The devices can be configured to capture data in specific spectrum bands as required by detection of targeted gas species (e.g., detect presence of carbon monoxide). In addition, the devices can be auto-configured to detect a specific range of temperatures or radiance field. Further, each of the image capturing devices can be individually configured for a specific spectrum band to increase the efficiency of the system and enable detection of multiple gas species in one or different regions of the furnace. Each image-capturing device 18 can be liquid-cooled by directing the inflow of cold coolant $C_{IN}$ to the device, and delivering the outflow of warm coolant $C_{OUT}$ from device to an outlet.

Each of the image-capturing devices 18 captures image sequences covering a selected interior portion or region of the enclosure 12, for which a temperature-radiance field and gas species field are to be estimated. A plurality of temperature sensors 20, such as thermal couples or pyrometers, which are each observable by one or more image-capturing devices 18, are placed inside the enclosure 12. Optional markers 22, which are within a field of view (FOV) of the image-capturing devices 18, may also be placed inside the enclosure 12.

Cables 24 (or other signal transferring means, such as wireless communication) connect the image-capturing devices 18 and the temperature sensors 20 to the computing device 14, which may also have digitization, storage, and user interface capabilities. The computing device 14 receives temperature outputs or signals from the temperature sensors 20 and image sequences from the image-capturing devices 18 to set proper parameters of the image-capturing devices for performing subsequent calibration, registration and estimating temperature-radiance field of the selected region.

It is an important task for an operator to optimally set the parameters related to the combustion process for maximum product yield, maximum energy efficiency, and minimum flue gas consumed. Often, the operator selectively controls the combustion process based on a visual estimation of a state of the process at specific locations inside the enclosure 12. Acquiring the states of the process necessitates the knowledge of the three-dimensional temperature and radiance field inside the enclosure 12.

In one embodiment, three-dimensional temperature and radiance fields are computed from a set of images, which are captured by optimally placed image-capturing devices 18 in the enclosure 12. As shown in FIG. 1, the plurality of image-capturing devices 18 are disposed in the enclosure 12, and the plurality of thermal couples or pyrometers 20 are disposed at selected locations of the enclosure for collecting data. The estimation unit 10 calculates and determines the temperature and radiance fields of the selected regions of the enclosure 12 based on the collected data.

Figure 2:
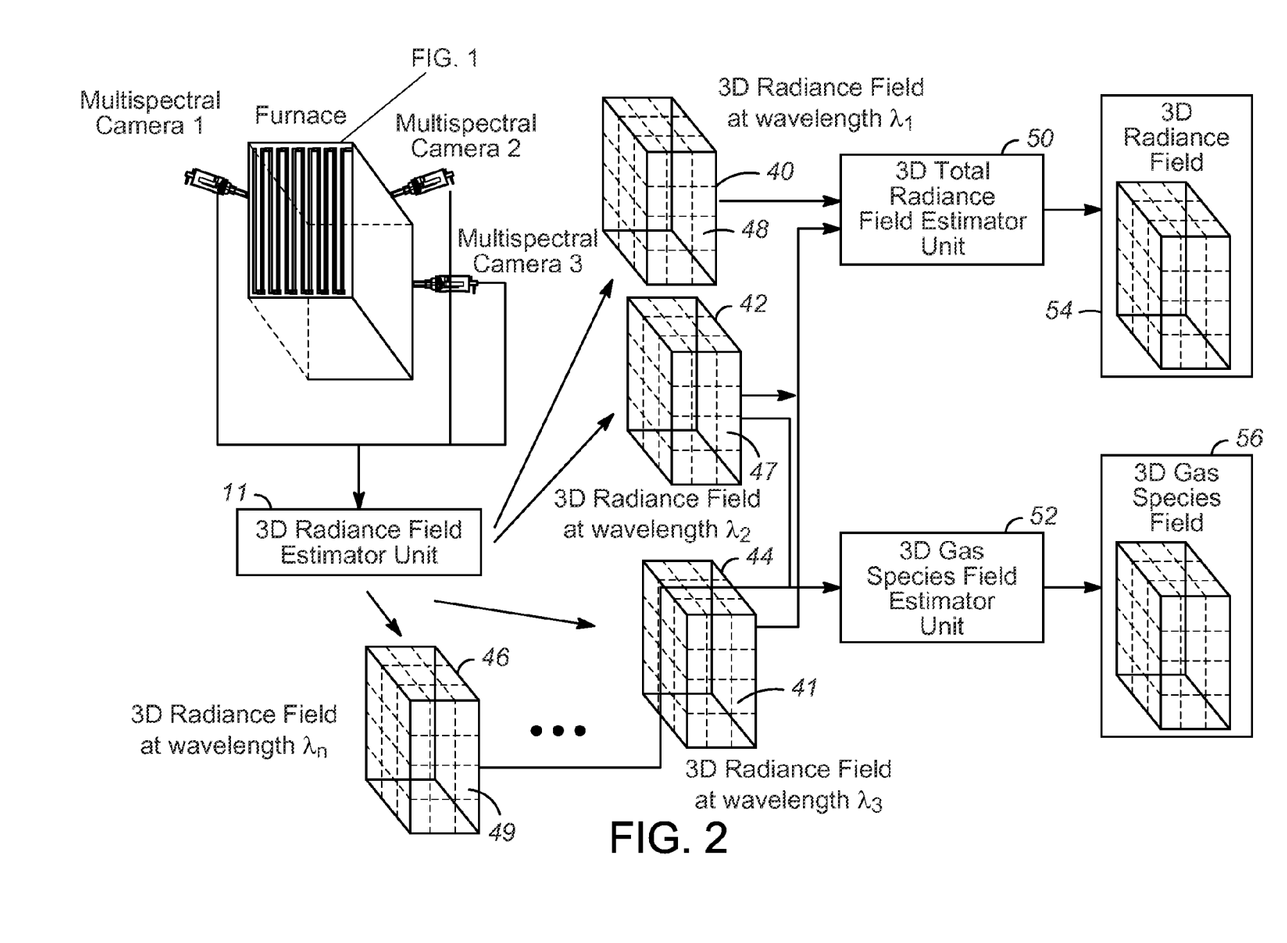
FIG. 2 illustrates an exemplary system for a 3D radiance field and gas species field estimation using the camera system shown in FIG. 1.

Referring now to FIG. 2, a schematic flow diagram of the three-dimensional radiance and gas species field estimation system illustrates its high level processes and the outputs of each process. The estimation unit 10, also known as a 3D radiance field estimator 11, computes the three-dimensional radiance fields of the furnace enclosure. Each three-dimensional radiance field corresponds to a particular spectral wavelength, $\lambda_i$. Having received the multi-spectral images from the multi-spectral image capturing devices 18, the 3D radiance field estimator 11 segregates the multi-spectral images into groups of images, each group corresponds to images of a spectral wavelength, $\lambda_i$. Using each group of images of a spectral wavelength, $\lambda_i$, the 3D radiance field estimation process, which is discussed below with respect to FIG. 3, generates a 3D radiance field at wavelength, $\lambda_i$. As a result, groups of 3D radiance fields at wavelengths, $\lambda_{1,2,3, \ldots, n}$, 40, 42, 44, . . . , 46 are generated. The different wavelengths may correspond to spectral bands in the visible spectrum, e.g., red, blue and green or other spectral bands of the ultra-violet, mid-wave infrared and long-wave infrared spectra.

Each of the 3D radiance fields 40, 42, 44, 46 consists of the voxels, 48, 47, 41 and 49 respectively. A 3D radiance field is composed of voxels. A voxel represents a 3D volume region in the furnace enclosure. Each voxel has an estimated value of the radiance at the wavelength $\lambda_i$ in a corresponding volume. A 3D total radiance field estimator 50 combines two or more outputs of 3D radiance fields at different wavelengths. The result is a total 3D radiance field 54. For example, the total radiance can be computed in the visible spectrum by summing the radiance fields from red, green and blue wavelengths. Further details are described below with respect to FIG. 4. A 3D gas species field estimator 52 detects the presence of gas species and computes their radiance in each of the voxels. The output of the unit 52 is a three-dimensional gas species field 56. Further details are described below with respect to FIG. 5.

Figure 3:
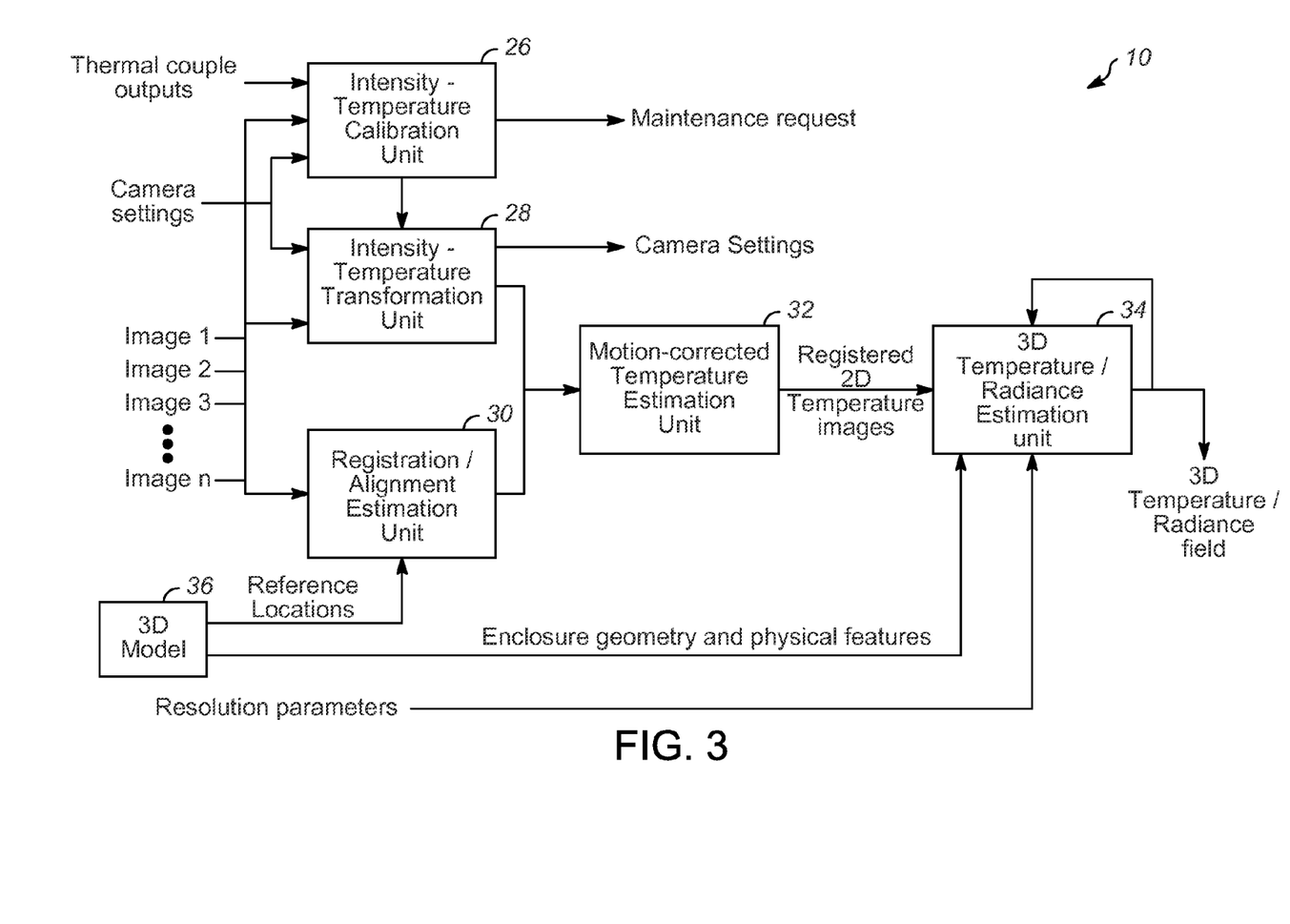
FIG. 3 is a functional block diagram of the present process featuring functional units in accordance with an embodiment of the present disclosure.

Referring now to FIG. 3, an explanation will be provided of how the estimation unit 10, of this embodiment, computes a 3D radiance field from a group of images at spectral wavelength $\lambda_i$. Included in the estimation unit 10 are an intensity-temperature calibration unit 26, an intensity-temperature transformation unit 28, a registration and alignment estimation unit 30, a motion-corrected temperature estimation unit 32, a 3D temperature-radiance estimation unit 34 and a 3D model of the furnace enclosure 36.

Intensities of the image pixels received from the image-capturing devices 18 are directly related to the temperatures of viewed surfaces in the enclosure 12. Calibration is performed to establish this relationship between the temperatures and intensities. According to Stefan-Boltzmann law, the radiant flux is proportional to the fourth power of the temperature. Thus a transformation from image intensity to radiance can be established based on the intensity to temperature relationship. Herein temperature and radiance are used interchangeably.

Conventional calibrations were performed based on an infrequent and inadequately updated off-line process. However, the image-capturing device response could become unstable in high-temperature, dynamic operating conditions. Consequently, the unstable response would render errors related to intensity-temperature transformation due to the stale off-line calibration.

On the other hand, in one preferred embodiment of the present device and method, thermal couples or pyrometers 20 are placed at selected locations in the enclosure 12 to be viewed or read by the image-capturing devices 18. The intensity-temperature calibration unit 26 performs an on-line calibration determining a relationship between an intensity of an image pixel and an actual temperature, which is established by using polynomial regression mapping temperature outputs and the corresponding pixel intensities from the image-capturing devices 18 with associated device settings.

The intensity-temperature calibration unit 26 also maintains records of the intensity-temperature calibration in a storage device, and compares the calibration data on-line during the combustion process. As the responses from the image-capturing devices 18 become degraded, or the lenses of the devices become dirty, current intensity-temperature calibration values differ from original or initial values in record. The intensity-temperature calibration unit 26 calculates the difference between the original value and the current values. When the difference exceeds a predetermined threshold, such as 15%, the intensity-temperature calibration unit 26 flags a maintenance request indicator to signal that system maintenance is required. The predetermined threshold can vary depending on the application, and can be edited by the operator.

Based on the intensity-temperature calibration, the intensity-temperature transformation unit 28 transforms the intensities of the corresponding images to the temperature values based on the device settings and the image pixels. An exemplary intensity-temperature calibration unit 26 and the intensity-temperature transformation unit 28 are disclosed in commonly assigned U.S. patent application Ser. No. 14/306,063, which is incorporated by reference in its entirety.

A dynamic range of image pixel values is limited to a number of bits per pixel. However, the temperature of the combustion process can reach up to 2500° F. or 1400° C. To cover an entire temperature range (e.g., 0-2500° F. or 0-1400° C.) the device parameters or settings, such as aperture, shutter, and gain can be selectively set and adjusted. During this intensity-temperature transformation, an intensity histogram of the image is evaluated by the intensity-temperature transformation unit 28. If the histogram is skewed or becomes uneven at a low or high end, the intensity-temperature transformation unit 28 makes appropriate changes in the parameters or settings of the image-capturing devices 18. This enables acquisition of the images with an optimal intensity range under the current operating conditions.

Unwanted movement of the image-capturing devices and imaging areas often occurs in the furnace enclosure 12. Specifically, in an industrial environment, vibrations and shakings of furnace walls can be caused by adjacent pieces of equipment that are frequently in contact with the furnace during operation. Since a temperature field computation relies on an accurate line of sight association with the physical structure, significant errors result if a relative motion of the image-capturing device 18 is not correctly set and adjusted. The accurate line of sight requirement is especially important for a high resolution temperature field computation. Correction of these unwanted movements is accomplished by the registration and alignment estimation unit 30 and the motion-corrected temperature estimation unit 32.

The registration and alignment estimation unit 30 computes a registration and alignment estimation for each of the multispectral image capturing devices 18 viewing a physical enclosure 12. Characteristic features that are distinct and easily recognizable in the multispectral image, such as view ports and corners of the furnace enclosure 12, are initially selected and subsequently detected. Their positional information in the image is associated with the three-dimensional geometrical coordinates of the enclosure, which can be determined from a 3D model 36. As mentioned above, it is preferred that readily recognizable markers 22, such as triangular ceramic tiles, are placed in the enclosure 12. Geometrical locations of these characteristic features also constitute reference points of the furnace enclosure 12. Corresponding pixel coordinates in the multi-spectral images are correlated with the geometrical locations of these markers 22.

The registration and alignment estimation unit 30 calculates a perspective transformation of the multi-spectral images based on these two sets of data, i.e., the geometrical reference points and the corresponding image pixel locations. After an application of the transformation on the temperature images, two-dimensional (2D) temperature images are aligned and registered by the registration and alignment estimation unit 30.

The motion-corrected temperature estimation unit 32 performs the perspective transformation on the temperature image, which is computed from the intensity-temperature transformation unit 28, such that the geometrical reference points and the corresponding image pixel locations are in alignment. In other words, the same pixel location represents the same physical location of the furnace in sequence of images. The correct temperatures of the furnace area are easily determined based on the corresponding image pixels even under relative motion of the image capturing devices 18. The output is a registered temperature image.

The 3D temperature-radiance estimation unit 34 applies a hierarchical, multi-resolution method to compute a three-dimensional temperature-radiance field of the furnace enclosure 12 based on the registered two-dimensional temperature images. When an operator is interested in certain areas or volumes in the enclosure 12 (e.g., the burners, or pipes), higher resolution is needed in the interested areas, but lower resolution is sufficient for the uninterested areas. For example, a hierarchical coarse-to-fine algorithm can be used to achieve or perform this multi-resolution method. An exemplary hierarchical, multi-resolution method is disclosed in commonly assigned U.S. patent application Ser. No. 14/177,005, which is incorporated by reference in its entirety.

For example, the 3D temperature-radiance estimation unit 34 calculates the 3D temperature field based on a coarse resolution (e.g., a 1 cubic feet) as mentioned above. The next resolution 3D temperature field (e.g., 0.125 cubic feet) may then be computed from the results of the initial resolution. The temperature field with fine resolution can be iteratively computed. However, only areas of interest and associated voxels need to be traversed down the hierarchy to the fine resolution. Inverses of matrices calculated using a radiative transfer equation are required in each resolution computation. An important aspect of this hierarchical, multi-resolution method is that computational time can be significantly saved during computation, and thus can be used as a real-time, on-line application. The above 3D radiance field estimator 11 is applied to groups of spectral images at wavelength $\lambda_i$ resulting in many 3D radiance fields, each at a specific wavelength $\lambda_i$.

Referring again to FIG. 2, the 3D total radiance field estimator 50 combines one or more 3D radiance fields to form a total radiance field of a broader spectrum, including, for example, visible or mid-wave infrared. Depending on the application, one of several combination methods, such as weighted sum, sum of interpolation and extrapolation, can be applied. Weight sum method computes the total radiance as the sum of the products of radiance at wavelength $\lambda_i$ and weight $w_i$. For example, the visible spectrum radiance is often computed by a weighted sum of red, green and blue radiances. Stun of interpolation and extrapolation method first extrapolate or interpolate radiance at other wavelengths and then sum all the original, interpolated and extrapolated radiances. The result is the total 3D radiance field 54, which is further described in FIG. 4.

Figure 4:
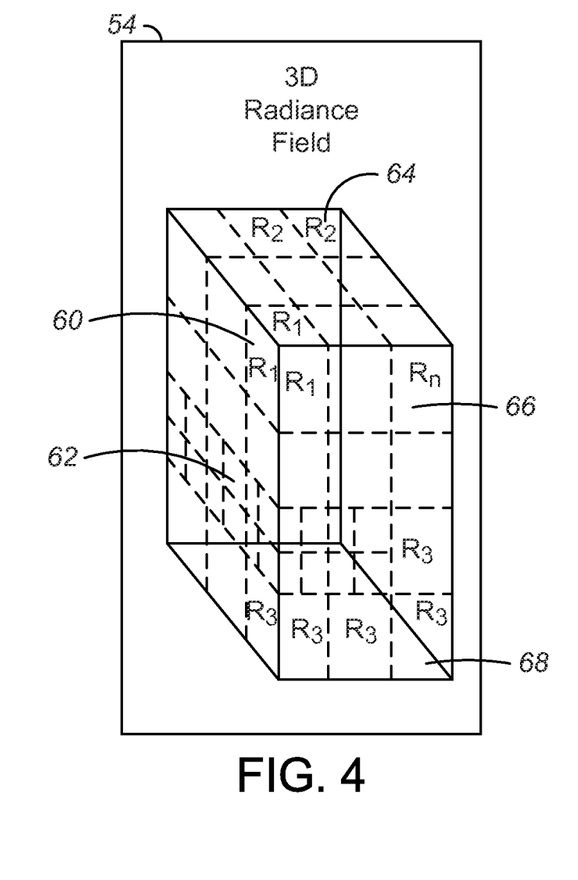
FIG. 4 illustrates an exemplary output of the 3D thermal radiance field estimation from the system shown in FIG. 2.

As shown in FIG. 4, voxels 60, 62, 64, 66 and 68 are examples of different voxels in the total radiance field. It can be seen that the voxel 62 is of a smaller size compared to the voxel 60. The voxel 60 is estimated to have a radiance value of $R_1$. Similarly, voxels 64 and 68 are shown to have output radiance estimates of $R_2$ and $R_3$, respectively. Each voxel, e.g., voxel 66, has a radiance output value of $R_n$.

Referring again to FIG. 2, the 3D gas species field estimator 52 detects and computes the composition of different gases in the furnace enclosure based on groups of 3D radiance fields at a selected wavelength $\lambda_i$. Radiance of each voxel in a radiance field at the wavelength is contributed from that of the gas species and air in that voxel. Spatial and temporal filtering is applied to each voxel to estimate and remove its radiance due to air. The residual radiance is due to the gas species. A radiance feature vector is generated from the corresponding voxels in the groups of radiance fields. For example, the residual radiance from voxels 48, 47, 41, and 49 forms a radiance feature vector. Classification method, such as a support vector machine, random forest. Bayesian model, determines the presence or absence of the target gas species. The radiance of the gas species in the output voxel can be estimated from the strength of the radiance feature vector. Compiling the results from each voxel creates the 3D gas species field 56.

In another embodiment, the 3D gas species field 56 can be computed with a function of a threshold value or gradient in selected 3D radiance fields of specific wavelengths $\lambda_i$. For example, a voxel having high radiance or high radiance gradient relative to the average of its surrounding voxels in the visible spectrum and that same voxels having threshold value or gradient value in the blue wavelength implies the presence of hydroxyl in that voxel. A voxel having high radiance or high radiance gradient relative to the average of its surrounding voxels in the visible spectrum and that same voxels having threshold value or gradient value in the green wavelength implies hydrogen combustion in that voxel. A voxel having high radiance or high radiance gradient relative to the average of its surrounding voxels in the visible spectrum and that same voxels having threshold value or gradient value in the yellow wavelength (combination of red and green wavelengths) implies carbon cracking within a flame in that voxel. The resulting functional values can be used directly or correlated with a data table of known concentrations relative to the signal strength of the function.

Figure 5:
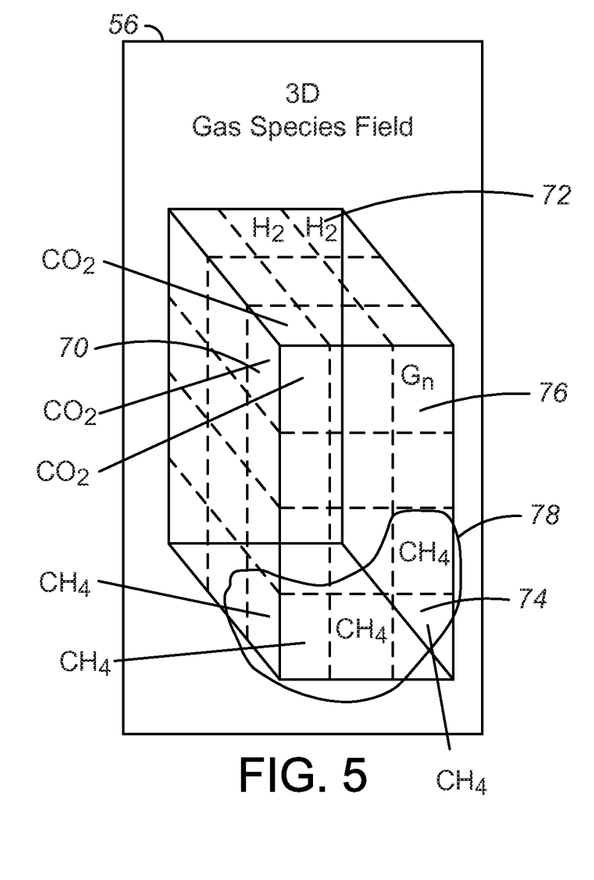
FIG. 5 illustrates an exemplary output of the 3D gas species field estimation from the system shown in FIG. 2.

Referring now to FIG. 5, the output 3D gas species field 56 is described in greater detail. Voxels 70, 72, 74, and 76 have different gas species as detected by the 3D gas species field estimator 52. Same gas species often occurs at groups of voxels, such as a region 78, which is a region consisting of, e.g., $CH_4$ (methane). A voxel in the 3D gas species field may not have a gas species. It may have only air in that voxel. Accurate detection of gas composition and concentrations help optimize the burner efficiency and increase the total system yield.

While a particular embodiment of the present estimation process has been described herein, it will be appreciated by those skilled in the art that changes and modifications may be made thereto without departing from the invention in its broader aspects and as set forth in the following claims.

What is claimed is:

1. A process for estimating a three-dimensional (3D) radiance field of a combustion process in an enclosure, comprising:
   performing an on-line intensity-temperature calibration based on an association between an intensity of an image pixel and an actual temperature associated with a selected region in the enclosure;
   transforming the intensity of the corresponding image to a radiance image based on settings of an image-capturing device and the on-line calibration;
   performing a registration and alignment estimation of the image based on positional information of the enclosure;

aligning the radiance image based on the registration estimation; and estimating, using a computer processor, the 3D radiance field having voxels of the enclosure based on a two-dimensional (2D)-to-3D transforming of the aligned radiance images.

2. The process according to claim 1, further comprising:
capturing images of selected spectral bands in the enclosure using a plurality of image capturing devices; and
estimating at least one of the 3D radiance fields of the selected spectral bands in the enclosure.

3. The process according to claim 2, further comprising:
computing a total 3D radiance field based on a subset of the at least one 3D radiance field associated with the settings of the image-capturing device for estimating a radiance value of the total 3D radiance field.

4. The process according to claim 2, further comprising:
detecting and computing a 3D gas species field of the enclosure using a function of statistical classification, threshold values or gradients in a subset of the at least one 3D radiance field associated with the settings of the image-capturing device.

5. The process according to claim 1, further comprising:
mapping at least one of a temperature and a gas species, and the corresponding intensity of the image pixel with the settings associated with the image-capturing device;
maintaining records of the intensity-temperature calibration in a storage device;
calculating a difference between a recorded intensity-temperature calibration value associated with the image pixel, and a current intensity-temperature calibration value; and
indicating that system maintenance is required when the difference exceeds a predetermined threshold.

6. The process according to claim 1, further comprising:
selectively adjusting the settings of the image-capturing device having parameters related to at least one of a wavelength, an aperture, a shutter, and a gain;
evaluating an intensity histogram of the corresponding image during the transforming of the intensity of the corresponding image to the 3D radiance field; and
adjusting the settings of the image-capturing device based on the evaluation of the histogram.

7. The process according to claim 1, further comprising:
determining the positional information by collecting a plurality of reference points in the enclosure using markers recognizable by the image-capturing device;
calculating a perspective transformation of the image based on the reference points and the corresponding image pixels; and
aligning and registering a two-dimensional (2D) temperature image based on the perspective transformation.

8. The process according to claim 1, further comprising:
computing the 3D radiance field of the enclosure based on the aligned radiance images using a hierarchical, multi-resolution method;
performing the hierarchical, multi-resolution method by applying a hierarchical coarse-to-fine algorithm based on a resolution of the selected region; and
calculating inverses of matrices using a radiative transfer equation for each resolution computation of the selected region to compute the 3D radiance field.

9. An apparatus for estimating a three-dimensional (3D) radiance field of a combustion process in an enclosure, the apparatus comprising:
an intensity-temperature calibration unit configured for performing an on-line intensity-temperature calibration based on an association between an intensity of an image pixel and an actual temperature associated with a selected region in the enclosure;
an intensity-temperature transformation unit configured for transforming the intensity of the corresponding image to a radiance image based on settings of an image-capturing device and the on-line calibration;
a registration and alignment estimation unit configured for performing a registration and alignment estimation of the image based on positional information of the enclosure, and aligning the radiance image based on the registration estimation; and
an estimation unit configured for estimating, using a computer processor, the 3D radiance field having voxels of the enclosure based on a two-dimensional (2D)-to-3D transforming of the aligned radiance images.

10. The apparatus according to claim 9, further comprising a 3D temperature-radiance estimation unit configured for:
capturing images of selected spectral bands in the enclosure using a plurality of image capturing devices; and
estimating at least one of the 3D radiance fields of the selected spectral bands in the enclosure.

11. The apparatus according to claim 9, wherein the intensity-temperature calibration unit is configured for:
mapping at least one of a temperature and a gas species, and the corresponding intensity of the image pixel with the settings associated with the image-capturing device;
maintaining records of the intensity-temperature calibration in a storage device;
calculating a difference between a recorded intensity-temperature calibration value associated with the image pixel, and a current intensity-temperature calibration value; and
indicating that system maintenance is required when the difference exceeds a predetermined threshold.

12. The apparatus according to claim 9, wherein the intensity-temperature transformation unit is configured for:
selectively adjusting the settings of the image-capturing device having parameters related to at least one of a wavelength, an aperture, a shutter, and a gain;
evaluating an intensity histogram of the corresponding image during the transforming of the intensity of the corresponding image to the 3D radiance field; and
adjusting the settings of the image-capturing device based on the evaluation of the histogram.

13. The apparatus according to claim 9, wherein the estimation unit is configured for:
computing a total 3D radiance field based on a subset of the at least one 3D radiance field associated with the settings of the image-capturing device for estimating a radiance value of the total 3D radiance field; and
detecting and computing a 3D gas species field of the enclosure using a function of statistical classification, threshold values or gradients in a subset of the at least one 3D radiance field associated with the settings of the image-capturing device.

14. The apparatus according to claim 9, wherein the registration and alignment estimation unit is configured for:
determining the positional information by collecting a plurality of reference points in the enclosure using markers recognizable by the image-capturing device;
calculating a perspective transformation of the image based on the reference points and the corresponding image pixels; and
aligning and registering a two-dimensional (2D) temperature image based on the perspective transformation.

15. The apparatus according to claim 9, wherein the estimation unit is configured for:
- computing the 3D radiance field of the enclosure based on the aligned radiance images using a hierarchical, multi-resolution method;
- performing the hierarchical, multi-resolution method by applying a hierarchical coarse-to-fine algorithm based on a resolution of the selected region; and
- calculating inverses of matrices using a radiative transfer equation for each resolution computation of the selected region to compute the 3D radiance field.

16. A non-transitory computer-readable medium storing instructions executable by a computer processor to estimate a three-dimensional (3D) radiance field of a combustion process in an enclosure, comprising instructions to:
- perform an on-line intensity-temperature calibration based on an association between an intensity of an image pixel and an actual temperature associated with a selected region in the enclosure;
- transform the intensity of the corresponding image to a radiance image based on settings of an image-capturing device and the on-line calibration;
- perform a registration and alignment estimation of the image based on positional information of the enclosure;
- align the radiance image based on the registration estimation; and
- estimate, using a computer processor, the 3D radiance field having voxels of the enclosure based on a two-dimensional (2D)-to-3D transforming of the aligned radiance images.

17. The medium according to claim 16, further comprising instructions to:
- capture images of selected spectral bands in the enclosure using a plurality of image capturing devices;
- estimate at least one of the 3D radiance fields of the selected spectral bands in the enclosure;
- map at least one of a temperature and a gas species, and the corresponding intensity of the image pixel with the settings associated with the image-capturing device;
- maintain records of the intensity-temperature calibration in a storage device;
- calculate a difference between a recorded intensity-temperature calibration value associated with the image pixel, and a current intensity-temperature calibration value; and
- indicate that system maintenance is required when the difference exceeds a predetermined threshold.

18. The medium according to claim 16, further comprising instructions to:
- selectively adjust the settings of the image-capturing device having parameters related to at least one of a wavelength, an aperture, a shutter, and a gain;
- evaluate an intensity histogram of the corresponding image during the transforming of the intensity of the corresponding image to the 3D radiance field; and
- adjust the settings of the image-capturing device based on the evaluation of the histogram.

19. The medium according to claim 16, further comprising instructions to:
- compute a total 3D radiance field based on a subset of the at least one 3D radiance field associated with the settings of the image-capturing device for estimating a radiance value of the total 3D radiance field; and
- detect and compute a 3D gas species field of the enclosure using a function of statistical classification, threshold values or gradients in a subset of the at least one 3D radiance field associated with the settings of the image-capturing device.

20. The medium according to claim 16, further comprising instructions to:
- determine the positional information by collecting a plurality of reference points in the enclosure using markers recognizable by the image-capturing device;
- calculate a perspective transformation of the image based on the reference points and the corresponding image pixels;
- align and register a two-dimensional (2D) temperature image based on the perspective transformation;
- compute the 3D radiance field of the enclosure based on the aligned radiance images using a hierarchical, multi-resolution method:
- perform the hierarchical, multi-resolution method by applying a hierarchical coarse-to-fine algorithm based on a resolution of the selected region; and
- calculate inverses of matrices using a radiative transfer equation for each resolution computation of the selected region to compute the 3D radiance field.

* * * * *